Jan. 4, 1927.
S. W. ELSTONE
TAP
Filed March 6, 1925
1,613,224
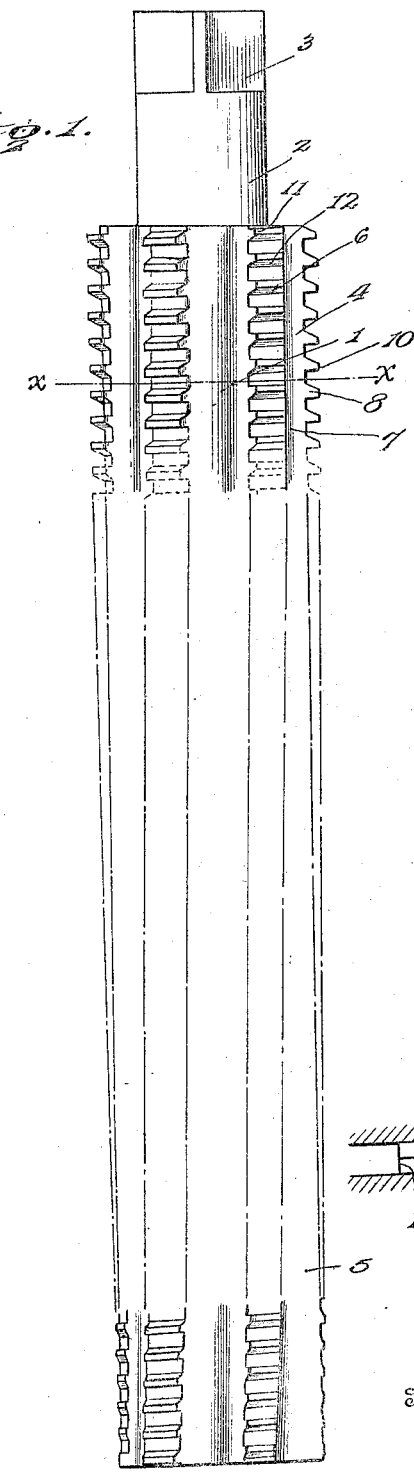
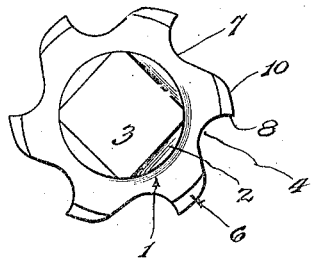
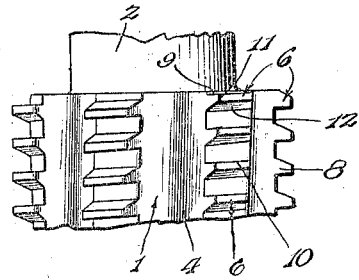
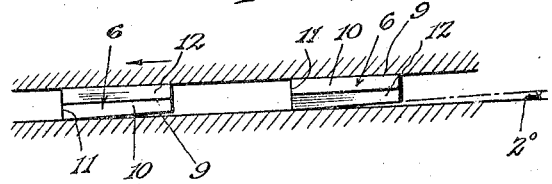
Inventor
Stanley W. Elstone.
By
Attorney Patented Jan. 4, 1927.

1,613,224

UNITED STATES PATENT OFFICE.

STANLEY W. ELSTONE, OF WALKERVILLE, ONTARIO, CANADA, ASSIGNOR TO HURON MANUFACTURING CO., OF DETROIT, MICHIGAN, A CORPORATION OF MICHIGAN.

TAP.

Application filed March 6, 1925. Serial No. 13,534.

This invention relates to taps and more particularly to a tap for cutting threads of the coarse square type in bushings and similar fittings.

Heretofore, the formation of threads of this type in bushings and similar fittings has been difficult of accomplishment and has entailed considerable expense, due to the fact that, so far as I am aware, no tap has previously been designed by which such threads may be accurately cut and it has been necessary to form the threads by the use of a lathe. Therefore, it is the primary object of the present invention to provide a tap of such construction that threads of the square coarse type may be readily and accurately cut in the wall of the bore of a bushing or other fitting and the cutting operation performed rapidly and without waste of material due to an inaccurate or distorted cut.

Another object of the invention is to provide a tap having thread cutting teeth so formed as to afford a desirable degree of clearance in the thread grooves in the piece of work, so that there will be no likelihood of binding of the teeth during the cutting operation or any choking of the grooves by the metal chips or shavings.

Another object of the invention is to provide a tap in which the teeth will be so formed that the walls of the thread grooves formed by the teeth will be smooth and will be accurately formed during the cutting operation.

Another important object of the invention is to provide a single tap of such conformation that the cutting operation may be performed in its entirety by the use of the tap and without the necessity of employing three separate and distinct taps as is now customary where threads of the V-type are to be formed so that the cutting operation is performed in less time and with less labor.

In the accompanying drawings:

Figure 1 is a view in elevation of the tap embodying the invention.

Figure 2 is a view looking at the upper end of the tap.

Figure 3 is a detail fragmentary view in elevation of the butt end of the tap.

Figure 4 is a schematic view illustrating the manner in which the teeth of the tap cut the thread grooves.

The tap comprises a shank 1 provided at its butt end with a short tang 2 having a squared end 3 whereby the tap may be mounted in a rotary chuck. Generally speaking, the shank 1 is of uniform diameter from its butt end to approximately the line $x$—$x$ on Figure 1 of the drawings, and from this point to its minor or entering end, the shank is gradually tapered or decreased in diameter. The shank is formed both in its cylindrical portion 4 and its tapered portion 5, with a plurality of series of teeth 6, each series extending longitudinally of the shank of the tap on a gradual helix, as best shown in Figure 1 of the drawings. The series of cutting teeth are separated by intervening flutes 7. The cutting ends of the teeth are indicated by the numeral 8 and by reference to Figure 2 of the drawings, it will be observed that from the cutting ends of the teeth of one series to the cutting ends of the teeth of the following series, considered in the direction in which the tap is rotated in the cutting operation, the surface of the tap, or, in other words, the outer surfaces of the teeth and the surfaces of the flutes 7, define an ogee curve. Each tooth 6 has a lateral cutting face 9 and it will be observed by reference to Figures 1, 3 and 4 of the drawings, that the cutting faces of the teeth in relatively adjacent series are oppositely located. It will also be observed by reference to Figure 2, that the outer side 10 of each tooth is curved inwardly from the cutting end 8 so that each tooth is of gradually decreasing height from its cutting end to its opposite end. At its cutting end, each tooth is, therefore, provided with a transverse cutting edge indicated by the numeral 11, which is at right angles to the lateral cutting face 9, and each tooth at its side which is opposite the side at which the cutting face 9 is located, is beveled as indicated by the numeral 12, it being observed by reference to Figures 3 and 4, that the beveled sides of the teeth of relatively adjacent series are oppositely located or presented. It will likewise be observed by reference to Figure 4 of the drawings, that while that side of each tooth which is presented toward the butt end of the shank extends on the same helical curve which is described by the corresponding wall of the thread groove cut by the teeth, the sides of the teeth which are presented toward the entering end of the shank are slightly obliquely disposed with respect to the first mentioned sides and as shown in the said Figure 4. This oblique disposition of the last mentioned side of each tooth is such that as the tooth passes through the thread groove in the cutting operation, there will be a clearance at said side of the tooth of approximately two degrees, thereby minimizing friction and insuring against binding of the teeth in the thread grooves as the grooves are being cut and likewise affording further clearance for the chips or shavings, the beveled sides 12 of the teeth likewise providing a clearance for the shavings or chips.

Inasmuch as the portion 4 of the shank of the tap is of uniform diameter throughout its length, the teeth throughout this portion of the tap are of uniform depth, but from this point to the entering end of the tap, the teeth are gradually decreased in depth as best shown in Figure 1 of the drawings, so that substantially at the entering end of the shank of the tap, the teeth nearly merge with the surface of the shank.

From the foregoing description of the invention, it will be obvious that due to the peculiar formation of the teeth and their relative arrangement, threads of the coarse square type may be quickly and accurately formed in a bushing or other fitting at minimum expense and without likelihood of waste of material.

Having thus described the invention, what I claim is:

1. A tap comprising a shank having longitudinal series of cutting teeth and intervening flutes, each tooth having a transverse cutting edge at its advancing end and having a transversely straight outer side receding inwardly from the said edge, the teeth having flat lateral cutting faces at an angle to their said edges, the said cutting teeth of relatively adjacent series being oppositely disposed, the side of each tooth which is presented toward the entering end of the shank being converged toward the opposite side of the tooth in the direction of the receding end thereof.

2. A tap comprising a shank having longitudinal series of cutting teeth and intervening flutes, each tooth having a transverse cutting edge at its advancing end and having a transversely straight outer side receding inwardly from the said edge, the teeth having flat lateral cutting faces at right angle to their said edges, the cutting faces of the teeth of relatively adjacent series being oppositely disposed, the side of each tooth which is presented toward the butt end of the shank extending on the same helical curve as described by the thread groove to be cut, and the side of each tooth which is presented toward the entering end of the shank being converged toward the first mentioned side in the direction of the receding end of the tooth.

In testimony whereof I affix my signature.

STANLEY W. ELSTONE. [L. S.]